(12) United States Patent
Wang et al.

(10) Patent No.: US 8,612,119 B2
(45) Date of Patent: Dec. 17, 2013

(54) ADAPTATION CONTROL OF LEAN NOX TRAP REGENERATION WITH BIODIESEL DURING ENGINE TRANSIENT OPERATION

(75) Inventors: Yue-Yun Wang, Troy, MI (US); Ibrahim Haskara, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 392 days.

(21) Appl. No.: 13/114,004

(22) Filed: May 23, 2011

(65) Prior Publication Data

US 2012/0303244 A1    Nov. 29, 2012

(51) Int. Cl.
*F02B 13/10*     (2006.01)
*F02B 13/00*     (2006.01)

(52) U.S. Cl.
USPC ........................................................ 701/103

(58) Field of Classification Search
USPC .................. 701/103, 102, 104–105; 123/575, 123/576–578, 299, 300, 304, 1 A, 704; 60/295, 39.511
See application file for complete search history.

(56) References Cited

U.S. PATENT DOCUMENTS 7,266,439 B2 *   9/2007   Wang et al. ................... 701/106

OTHER PUBLICATIONS

U.S. Appl. No. 12/850,112, Haskara et al.
U.S. Appl. No. 13/113,177, Wang et al.
U.S. Appl. No. 12/720,815, Wang et al.

* cited by examiner

*Primary Examiner* — Mahmoud Gimie

(57) ABSTRACT

An engine is fueled with a fuel blend of diesel and bidiesel fuel. A feed forward fuel control term is provided corresponding to a 100 percent diesel fuel blend and a feedback fuel control term corrects for lambda deviations resulting in a final fuel control term. During regeneration of a lean Nox trap, the feed forward fuel control term is adapted with a factor as a function of the feed forward fuel control term and the final fuel control term.

11 Claims, 4 Drawing Sheets

ADAPTATION CONTROL OF LEAN NOX TRAP REGENERATION WITH BIODIESEL DURING ENGINE TRANSIENT OPERATION

TECHNICAL FIELD

This disclosure is related to control of regeneration of a lean NOx trap in an engine utilizing biodiesel fuel.

BACKGROUND

The statements in this section merely provide background information related to the present disclosure. Accordingly, such statements are not intended to constitute an admission of prior art.

Diesel engines can operate on a 100% diesel supply of fuel. Additionally, diesel engines can be configured to operate partially or fully on a biodiesel supply of fuel. A biodiesel blend ratio can be identified. B0 fuel is identified as a 100% diesel supply of fuel. B100 fuel is identified as 100% biodiesel supply of fuel. Bx fuel can be identified with x % biodiesel composition and (100%-x %) diesel composition. For example, B40 fuel is a 40% biodiesel and 60% diesel composition.

Diesel fuel and biodiesel fuel include different properties. Diesel fuel has a higher energy density than biodiesel fuel. As a result, in order to achieve a substantially identical result in combustion, a greater mass of biodiesel needs to be injected than would be required of diesel under the same circumstances. Use of fuel in combustion can be adjusted based upon the biodiesel blend ratio. Further, wherein fuel is utilized for other purposes than combustion within the engine, the mass of fuel utilized similarly must be adjusted based upon the biodiesel ratio.

One use of fuel includes regeneration of a lean NOx trap (LNT). NOx is a component of an exhaust gas flow generated by the engine during combustion. Aftertreatment devices are known to treat NOx within the exhaust gas flow, converting the NOx into other substances to be expelled with the exhaust. An LNT includes chemicals that store NOx emissions during engine operations generating NOx and allow release of the stored NOx during fuel rich conditions. The LNT has limited storage capacity and must be regenerated with a fuel rich reducing "pulse" as it nears capacity. It is desirable to control the efficiency of the regeneration event o provide optimum emission control and while maintaining minimum fuel consumption.

SUMMARY

A method to control an internal combustion engine fueled by a fuel blend of a diesel fuel and a biodiesel fuel and equipped with a lean NOx trap for treating an exhaust gas flow from the engine includes providing a feed forward fuel control term corresponding to a fuel blend of 100 percent diesel fuel and 0 percent biodiesel fuel, and providing a feedback fuel control term as a function of a deviation in the engine air fuel ratio from an air fuel ratio target. During engine operation wherein said lean NOx trap is not being regenerated, a final fuel control term is provided as function of the feed forward fuel control term and the feedback fuel control term. During engine operation wherein said lean NOx trap is being regenerated, a feed forward adaptation factor is provided as a function of the feed forward fuel control term and the final fuel control term, the feed forward adaptation factor is applied to the feed forward fuel control term to provide an adapted feed forward fuel control term, and the final fuel control term is provided as a function of the adapted feed forward fuel control term and the feedback fuel control term. The engine is fueled in accordance with the final fuel control term.

BRIEF DESCRIPTION OF THE DRAWINGS

One or more embodiments will now be described, by way of example, with reference to the accompanying drawings, in which.

DETAILED DESCRIPTION

Figure 1:
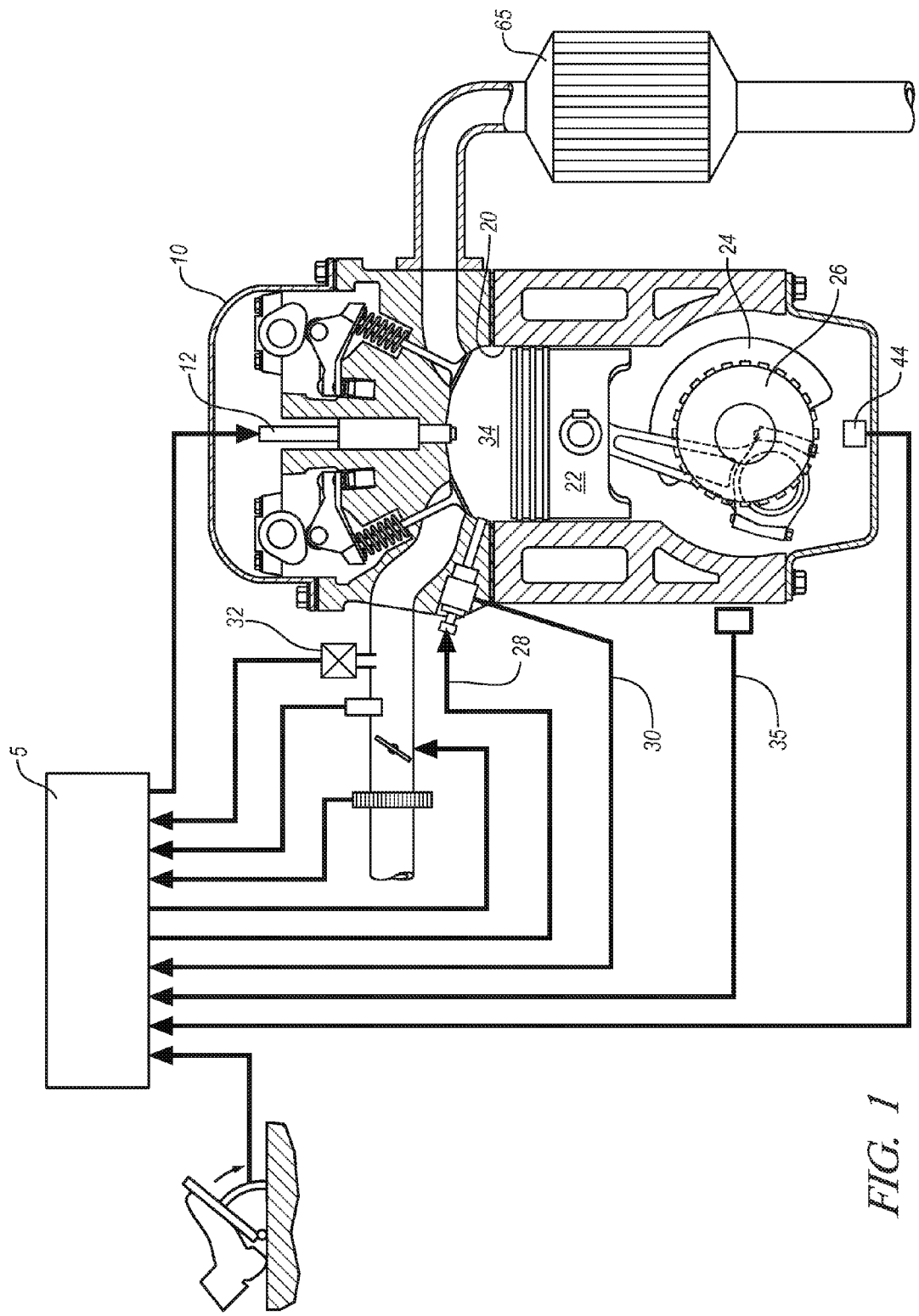
FIG. 1 illustrates an exemplary internal combustion engine, control module, and exhaust aftertreatment system, in accordance with the present disclosure.

Referring now to the drawings, wherein the showings are for the purpose of illustrating certain exemplary embodiments only and not for the purpose of limiting the same, FIG. 1 illustrates an exemplary internal combustion engine 10, control module 5, and exhaust aftertreatment system 65. The exemplary engine includes a multi-cylinder, direct-injection, compression-ignition internal combustion engine having reciprocating pistons 22 attached to a crankshaft 24 and movable in cylinders 20 which define variable volume combustion chambers 34. The crankshaft 24 is operably attached to a vehicle transmission and driveline to deliver tractive torque thereto, in response to an operator torque request, $T_{O\_REQ}$. The engine preferably employs a four-stroke operation wherein each engine combustion cycle includes 720 degrees of angular rotation of crankshaft 24 divided into four 180-degree stages (intake-compression-expansion-exhaust), which are descriptive of reciprocating movement of the piston 22 in the engine cylinder 20. A multi-tooth target wheel 26 is attached to the crankshaft and rotates therewith. The engine includes sensors to monitor engine operation, and actuators which control engine operation. The sensors and actuators are signally or operatively connected to control module 5.

The engine is preferably a direct-injection, four-stroke, internal combustion engine including a variable volume combustion chamber defined by the piston reciprocating within the cylinder between top-dead-center and bottom-dead-center points and a cylinder head including an intake valve and an exhaust valve. The piston reciprocates in repetitive cycles each cycle including intake, compression, expansion, and exhaust strokes.

The engine preferably has an air/fuel operating regime that is primarily lean of stoichiometry. One having ordinary skill in the art understands that aspects of the disclosure are applicable to other engine configurations that operate primarily lean of stoichiometry, e.g., lean-burn spark-ignition engines.

During normal operation of the compression-ignition engine, a combustion event occurs during each engine cycle when a fuel charge is injected into the combustion chamber to form, with the intake air, the cylinder charge.

The engine is adapted to operate over a broad range of temperatures, cylinder charge (air, fuel, and EGR) and injection events. The methods described herein are particularly suited to operation with direct-injection compression-ignition engines operating lean of stoichiometry to determine parameters which correlate to heat release in each of the combustion chambers during ongoing operation. The methods are further applicable to other engine configurations, including spark-ignition engines, including those adapted to use homogeneous charge compression ignition (HCCI) strategies. The methods are applicable to systems utilizing multi-pulse fuel injection events per cylinder per engine cycle, e.g., a system employing a pilot injection for fuel reforming, a main injection event for engine power, and, where applicable, a post-combustion fuel injection event for aftertreatment management, each which affects cylinder pressure.

Sensors are installed on or near the engine to monitor physical characteristics and generate signals which are correlatable to engine and ambient parameters. The sensors include a crankshaft rotation sensor, including a crank sensor 44 for monitoring crankshaft (i.e. engine) speed (RPM) through sensing edges on the teeth of the multi-tooth target wheel 26. The crank sensor is known, and may include, e.g., a Hall-effect sensor, an inductive sensor, or a magnetoresistive sensor. Signal output from the crank sensor 44 is input to the control module 5. A combustion pressure sensor 30 is adapted to monitor in-cylinder pressure (COMB_PR). The combustion pressure sensor is preferably non-intrusive and includes a force transducer having an annular cross-section that is adapted to be installed into the cylinder head at an opening for a glow-plug which is provided a controlled a glow-plug current 28. The output signal 30, COMB_PR, of the pressure sensor is proportional to cylinder pressure. The pressure sensor includes a piezoceramic or other device adaptable as such. Other sensors preferably include a manifold pressure sensor for monitoring manifold pressure (MAP) and ambient barometric pressure (BARO), a mass air flow sensor for monitoring fresh air mass flow (MAF), and a coolant sensor 35 monitoring engine coolant temperature (COOLANT). The system may include an exhaust gas sensor for monitoring states of one or more exhaust gas parameters, e.g., temperature, air/fuel ratio, and constituents. One skilled in the art understands that there may other sensors and methods for purposes of control and diagnostics. The operator input, in the form of the operator torque request, $T_{O\_REQ}$, is typically obtained through a throttle pedal and a brake pedal, among other devices. The engine is preferably equipped with other sensors for monitoring operation and for purposes of system control. Each of the sensors is signally connected to the control module 5 to provide signal information which is transformed by the control module to information representative of the respective monitored parameter. It is understood that this configuration is illustrative, not restrictive, including the various sensors being replaceable with functionally equivalent devices and algorithms.

The actuators are installed on the engine and controlled by the control module 5 in response to operator inputs to achieve various performance goals. Actuators include an electronically-controlled throttle valve which controls throttle opening in response to a control signal (ETC), and a plurality of fuel injectors 12 for directly injecting fuel into each of the combustion chambers in response to a control signal (INJ_PW), all of which are controlled in response to the operator torque request, $T_{O\_REQ}$. An exhaust gas recirculation (EGR) valve 32 and cooler control flow of externally recirculated exhaust gas to the engine intake, in response to a control signal from the control module. A glow-plug is installed in each of the combustion chambers and adapted for use with the combustion pressure sensor. Additionally, a charging system can be employed in some embodiments supplying boost air according to a desired manifold air pressure.

Fuel injector 12 is a high-pressure fuel injector adapted to directly inject a fuel charge into one of the combustion chambers in response to the command signal, INJ_PW, from the control module. Each of the fuel injectors 12 is supplied pressurized fuel from a fuel distribution system, and have operating characteristics including a minimum pulsewidth and an associated minimum controllable fuel flow rate, and a maximum fuel flow rate.

The engine may be equipped with a controllable valvetrain operative to adjust openings and closings of intake and exhaust valves of each of the cylinders, including any one or more of valve timing, phasing (i.e., timing relative to crank angle and piston position), and magnitude of lift of valve openings. One exemplary system includes variable cam phasing, which is applicable to compression-ignition engines, spark-ignition engines, and homogeneous-charge compression ignition engines.

The control module 5 executes routines stored therein to control the aforementioned actuators to control engine operation, including throttle position, fuel injection mass and timing, EGR valve position to control flow of recirculated exhaust gases, glow-plug operation, and control of intake and/or exhaust valve timing, phasing, and lift on systems so equipped. The control module is configured to receive input signals from the operator (e.g., a throttle pedal position and a brake pedal position) to determine the operator torque request, $T_{O\_REQ}$, and from the sensors indicating the engine speed (RPM) and intake air temperature (Tin), and coolant temperature and other ambient conditions.

Control module, module, control, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other suitable components to provide the described functionality. Software, firmware, programs, instructions, routines, code, algorithms and similar terms mean any controller executable instruction sets including calibrations and look-up tables. The control module has a set of control routines executed to provide the desired functions. The routines are preferably executed during preset loop cycles. Routines are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, routines may be executed in response to occurrence of an event.

FIG. 1 illustrates an exemplary diesel engine, however, the present disclosure can similarly be utilized on other engine configurations, for example, including gasoline-fueled engines, ethanol or E85 fueled engines, or other similar known designs. The disclosure is not intended to be limited to the particular exemplary embodiments described herein.

A control module monitors engine operation and determines a need to regenerate a LNT based upon the estimated NOx stored on the device and the capacity of the device to store NOx. During a regeneration of the LNT, a period of stoichiometric or preferably slightly rich operation of the engine is utilized to provide the necessary chemistry in the LNT to reduce NOx into other compounds such as $N_2$ and water. One metric to track a degree with which an engine is operating rich or lean includes lambda ($\lambda$), wherein $\lambda$, equals a current air fuel ratio (AFR) divided by an AFR at stoichiometric operation. In one exemplary engine configuration, a $\lambda$, value of 0.98 can be preferred to operate a regeneration event of an LNT. Operation at higher $\lambda$ values can fail to provide the necessary conditions in the LNT to effectively reduce the NOx, and operation at lower $\lambda$ values can cause excess fuel to slip past the LNT. Based upon the desired regeneration event, the control module changes the AFR of the engine, determining an appropriate lambda command, delivering more fuel to the engine to achieve the desired $\lambda$ value. Fuel injection is controlled by controlling a fuel injection duty cycle or controlling fuel injection quantities. While a given mass of liquid from a fuel system can be accurately delivered, an achieved $\lambda$ value will depend upon a composition of the liquid, for example, the biodiesel blend ratio of the liquid being injected. For example, if a fuel injection including B100 fuel is injected into the cylinder at a measured amount intended for B0 fuel to operate a regeneration event at a desired $\lambda$ value or lambda command value of 0.98, the lower energy density of the B100 fuel will result in an achieved $\lambda$ value being higher than 0.98. If the fuel injection is modified, including an increased injection based upon the properties of B100 fuel, the desired $\lambda$ value can be achieved.

A method to operate a regeneration event based upon an indication of a blend ratio for fuel being utilized by the engine is disclosed. A method to determine a blend ratio of different fuels (e.g. diesel and biodiesel) is disclosed in co-pending and commonly assigned U.S. Ser. No. 13/113,177, which is incorporated herein by reference. By directly estimating the blend ratio, properties of the fuel with that blend ratio can be estimated or determined from look-up values.

A desired quantity of fuel to be injected in a combustion cycle of a diesel engine can be determined based upon a desired AFR. According to one embodiment, a feed forward fuel control term (FF) can be used to inject the desired quantity of fuel. In one example, at a stoichiometric AFR for B0 fuel ($AFR_{stRD}$), the following relationship can be used to command fuel injection:

$$FF_{stRD} = \frac{MAF}{AFR_{stRD}} = \frac{MAF}{14.59} \quad [1]$$

wherein MAF is the mass air flow measured for the fresh air mass flow, for example, by a MAF sensor. However, due to the difference in energy density between diesel fuel and biodiesel fuel, Eq. 1 does not provide an accurate FF value when biodiesel is present.

A feedback control command (FB) can be used to control an engine, for example, adjusting fuel injection in cooperation with FF, with FF providing a calibrated fuel injection quantity based upon monitored control parameters for the engine and FB providing feedback control of the engine based upon comparing desired operation of the engine to actual operation of the engine. According to one embodiment, a total or final fuel control term for a combustion cycle (final_fuel) can be determined as follows.

$$\text{final\_fuel} = FF + FB \quad [2]$$

FF in Eq. 2 is calibrated based upon desired operation of the engine, for example, including a $T_{O\_REQ}$ indicating a desired torque output of the engine, and operation of the engine resulting from combustion of B0 fuel. Actual operation of the engine with injection of B0 fuel according to FF will closely match desired operation of the vehicle, with FB adjusting any disparity between desired operation and actual operation. Because FF will accurately control the engine, FB will be relatively small. If biodiesel is present and the energy density of the injected fuel is different from energy density expected of B0 fuel, actual operation of the engine as a result of FF will differ from desired operation of the engine by increasing margins as the biodiesel blend ratio of the fuel increases. As a result of the increasing difference between actual operation resulting from FF and desired operation with increasing biodiesel blend ratio values, FB values must increase to adjust for the difference. While FB can correct for discrepancy caused by inaccurate FF control, feedback control can include error, including slow response to a desired value and overshoot error. As FB increases in magnitude, the risk of a slow response and overshoot error increases.

In the alternative to directly estimating a biodiesel blend ratio, a method to determine an indication of the biodiesel blend ratio for fuel being utilized by the engine includes monitoring the magnitude of the feedback being commanded. $FF_{stRD}$ is FF for B0 fuel at stoichiometric operation. Because $FF_{stRD}$ is calibrated to B0 fuel and FB adjusts engine operation based upon a difference between current operation and desired operation based upon $FF_{stRD}$, monitoring the magnitude of FB provides an indication of how much the operation of the engine is differing from expected values. This difference in engine operation can be utilized to indicate a biodiesel blend ratio of the fuel being utilized for control of regeneration events or otherwise provide for adapting control of FF based upon the fuel composition.

Figure 2:
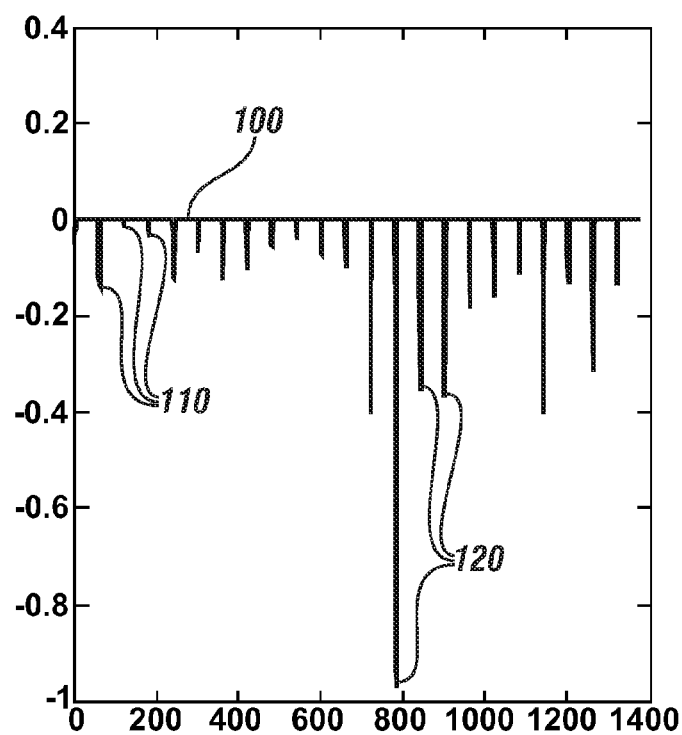
FIG. 2 illustrates feedback commands to an engine through a series of regeneration events in two periods of operation, in accordance with the present disclosure.

FIG. 2 illustrates feedback commands to an engine through a series of regeneration events in two periods of operation. A horizontal x-axis illustrates time in seconds. A vertical y-axis illustrates a magnitude of a FB value resulting from control as disclosed herein, correcting for a difference between operation under FF and actual operation of the engine, with illustrated values describing FB values utilized during regeneration events. Plot 100 includes the illustrated values. A first portion of time through approximately 700 seconds includes FB values corresponding to operation with B0 fuel. Value peaks 110 illustrate that only small FB values are required to correct for operation according to FF. At approximately 700 seconds, the fuel supply for the engine is changed to a fuel with a high biodiesel blend ratio. Corresponding FB values, illustrated by value peaks 120, increase significantly, reflecting larger differences between desired operation of the engine and actual operation of the engine that would result from control according to FF values.

Figure 3:
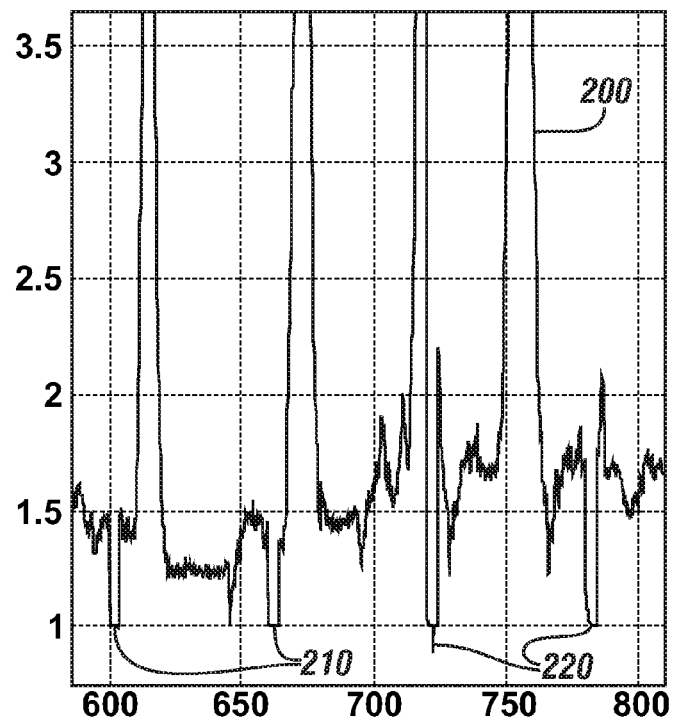
FIG. 3 illustrates lambda values through a series of regeneration events in two periods of operation, in accordance with the present disclosure.

FIG. 3 illustrates lambda values through a series of regeneration events in two periods of operation. A horizontal x-axis illustrates time in seconds. A vertical y-axis illustrates lambda ($\lambda$) values. A first portion of time through approximately 700 seconds includes $\lambda$ values corresponding to operation with B0 fuel. A second portion of time through approximately 700 seconds includes $\lambda$ values corresponding to operation with a high biodiesel blend ratio. Plot 200 illustrates the λ values through the time periods, including two regeneration events 210 wherein λ is controlled to approximately 1.0 and two regeneration events 220 wherein λ is controlled to approximately 1.0. Regeneration events 210 occur when B0 fuel is being used to fuel the engine and illustrate accurate control of λ to the desired λ value. Regeneration events 220 occur when fuel with the high biodiesel blend ratio is being used to fuel the engine. The first regeneration event 220, occurring at approximately 720 seconds, illustrates overshoot, wherein λ goes below 1.0 before being restored to 1.0. The second regeneration event 220, occurring at approximately 785 seconds, illustrates a slow response, wherein λ takes longer than usual to reach 1.0. As a result of the fuel with the high biodiesel blend ratio, the ability of the engine to control λ is impaired due to the high degree of feedback control required to correct the feed forward fuel control term associated with the high biodiesel blend ratio.

Testing has shown that effects of a high biodiesel blend ratio upon combustion are substantially linear with respect to a percentage of the fuel that is biodiesel compared to a percentage of the fuel that is diesel. As a result, given an accurate indication of the biodiesel blend ratio for the fuel being utilized in the engine, a feed forward control correction or feed forward control adaptation factor based upon a linear adjustment to FF is possible, creating a feed forward control adapted for the biodiesel blend ratio.

Wherein the biodiesel blend ratio is determined or estimated directly, an adaptation factor α can be a calibrated value based upon the determined biodiesel blend ratio. In the alternative, when another indication of the biodiesel blend ratio can be monitored or determined, α can similarly be determined Expanding upon Eq. λ operating at stoichiometry or with λ approximately equal to one (for example, including a value of 0.98) at time t, such as is controlled during a regeneration event, an adaptation factor α(t) can be used to define final_fuel(t) as a function of $FF_{stRD}$.

$$final_{fuel(t)} = FF_{stRD}(t) + FB(t) \quad [3]$$
$$= FF_{stRD}(t)\left(1 + \frac{FB(t)}{FF_{stRD}(t)}\right)$$
$$= FF_{stRD}(t) \cdot \alpha(t)$$

Solving for α in this embodiment, illustrating a magnitude of FB(t) related to final_fuel(t) and $FF_{stRD}(t)$ as an indication of biodiesel blend ratio, monitored parameters from one combustion cycle can be used to determine a for use in adapting FF in the next combustion cycle. Wherein $AFR_{stBD}$ equals the stoichiometric air fuel ratio for a fuel composition presently being utilized by the engine including a portion of biodiesel fuel, the factor can be expressed as follows:

$$\alpha = \frac{final\_fuel}{FF_{stRD}} \quad [4]$$
$$= \frac{final\_fuel \cdot AFR_{stRD}}{MAF}$$
$$= \frac{AFR_{stRD}}{AFR_{stBD} \cdot \left(\frac{MAF}{final\_fuel}{AFR_{stBD}}\right)}$$

wherein $$\frac{MAF}{\frac{final\_fuel}{AFR_{stBD}}}$$

with feedback control active can be estimated to be equal to one, based upon the feedback control commanding a value close to one (for example, 0.98), yielding the following expression.

$$\alpha = \frac{AFR_{stRD}}{AFR_{stBD}} \quad [5]$$

By determining $AFR_{stBD}$ for fuel being utilized by the engine, an indication of the biodiesel blend ratio, and comparing it to $AFR_{stRD}$, α can be determined.

According to one method to estimate a based upon final_fuel and $FF_{stRD}$, a Kalman filter and state space model can be utilized. A gamma ratio can be defined as follows.

$$r(t) = \frac{final\_fuel}{FF_{stRD}} \quad [6]$$

In operation, α is a noisy term with significant variation. The gamma ratio, r(t), represents α(t), and use of a filter such as a Kalman filter permits the noise to be filtered out and an accurate value to be estimated. A state space model can be defined as follows:

$$\alpha_{k+1} = \alpha_k + w_k, \alpha_0 = 1 \quad [7]$$

$$y_k = H_k \alpha_k + v_k, \quad [8]$$

$$y_k = r(t), H_k = 1 \quad [9]$$

$$\alpha_k = \frac{AFR_{stRD}}{AFR_{stBD}} \quad [10]$$

wherein $v_k$ and $w_k$ are white noise terms. A predicted state can be defined as follows.

$$\hat{\alpha}_{k|k-1} = F_k \hat{\alpha}_{k-1|k-1} + w_{k-1} \quad [11]$$

$$\tilde{y}_k = z_k - H_k \hat{\alpha}_{k|k-1} \quad [12]$$

$$\hat{\alpha}_{k|k} = \hat{\alpha}_{k|k-1} - K_k \tilde{y}_k \quad [13]$$

A predicted estimate covariance can be defined as follows.

$$P_{k|k-1} = F_k P_{k-1|k-1} F_k^T + Q_{k-1} \quad [14]$$

The Kalman filter outputs $\hat{\alpha}_{k|k}$ which can be utilized as adaptation factor α as disclosed herein. $\hat{\alpha}_{k|k}$ can be used to determine the biodiesel blend ratio, for example, for comparison to a biodiesel blend ratio determined by another method, as follows:

$$BD = \frac{\frac{AFR_{stBD}}{AFR_{stRD}} - 1}{\frac{AFR_{stB100}}{AFR_{stRD}} - 1} \cdot 100\% \cong \frac{\frac{1}{\hat{\alpha}_{k|k}} - 1}{\frac{AFR_{stB100}}{AFR_{stRD}} - 1} \cdot 100\% \quad [15]$$

wherein $AFR_{stB100}$ is the AFR at stoichiometry for B100 fuel and BD is the biodiesel blend ratio as a percentage.

Variations on the disclosed equations can be utilized to determine α for control of a regeneration event. For example, α can be estimated according to a number of biodiesel blend detection methods. For example, based upon a determinable lower heating value for the current fuel mix, $LHV_{BD}$, and comparison to a lower heating value for diesel fuel, $LHV_{RD}$, α can be determined as follows:

$$\alpha = \frac{AFR_{stRD}}{AFR_{stBD}} \approx k \frac{LHV_{RD}}{LHV_{BD}} \quad [16]$$

wherein k is a calibrated constant. The disclosed methods determine a factor for adjusting feed forward fuel control terms. A similar method can be utilized adjusting or adapting air throttle control as follows.

$$MAF_{cmdBD} = \frac{AFR_{stBD}}{AFR_{stRD}} MAF_{cmdRD} \quad [17]$$

The air throttle command based upon operation of the engine solely with diesel fuel, $MAF_{cmdRD}$, can be modified by the $AFR_{stBD}/AFR_{stRD}$ to determine an air throttle command adjusted to the fuel being utilized by the engine, $MAF_{cmdBD}$.

For a steady fuel mixture with a constant biodiesel blend ratio, α is a constant value, but precise determination of α can difficult due to signal noise. According to one embodiment, α can be estimated during a regeneration event by using a window moving average. According to another embodiment, a Kalman filter or other filtering technique can be used to improve accuracy of the determination of α. Implementing control based upon α with engine operation at λ approximately equal to one, an adaptation rule can be determined and utilized at iteration k, applying a first order filter, including the following:

$$FF_{stBD} = y_k \cdot FF_{stRD} \quad [18]$$

$$y_k = c_1 Y_{k-1} + (1-c_1) \cdot \alpha_{k-1} \quad [19]$$

wherein $FF_{stBD}$ is the feed forward fuel control term for the fuel blend currently being utilized by the engine;

$c_1$ is a calibrated constant; and $y_k$ is an output adaptation rate based upon α.

Figure 4:
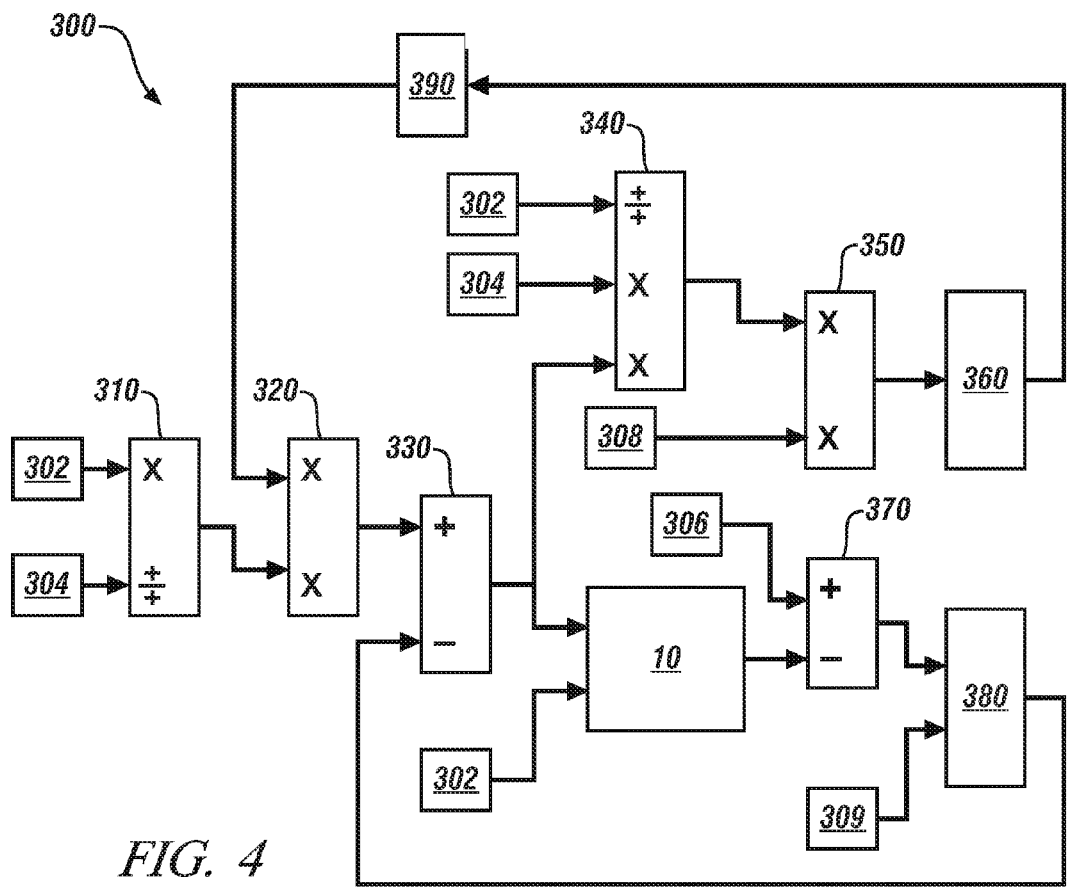
FIG. 4 illustrates information flow related to controlling an engine utilizing an adaptation factor to adjust a feed forward control, in accordance with the present disclosure.

FIG. 4 illustrates information flow related to controlling an engine utilizing an adaptation factor to adjust a feed forward fuel control term. Configuration 300 includes diesel feed forward command module 310, monitoring a MAF sensor signal from module 302 and an $AFR_{stRD}$ value of 14.59 from module 304. Diesel feed forward command module 310 determines and outputs $FF_{stRD}$. Adapted feed forward command module 320 inputs $FF_{stRD}$ and an output adaptation rate, $y_k$, from module 390, for example, determined based upon a last iteration of the information flow. Adapted feed forward command module 320 determines $FF_{stBD}$, a feed forward fuel control term adapted to a current biodiesel blend ratio or an adapted feed forward fuel control term, for example, according to Eq. 18. Final_fuel command module 330 monitors $FF_{stBD}$ and a feedback control FB from lambda feedback control module 380. Final_fuel command module 330 determines and outputs a final_fuel control term for use in controlling engine 10 during regeneration events. During operation of the engine, engine operation including an actual lambda reading of a charge of the engine is monitored, for example, by monitoring a wide range air fuel (WRAF) sensor. Lambda comparison module 370 monitors the actual lambda reading and compares the reading to a lambda target value from module 306. The lambda target value can be set to the 0.98 value disclosed herein. Lambda comparison module 370 determines and outputs a lambda control error value based upon the comparison. Lambda feedback control module 380 monitors the lambda control error value and a regeneration timing signal from timing module 309. Lambda feedback control module 380 determines and outputs the FB signal. Gamma ratio module 340 monitors the final fuel control term, the MAF signal from module 302, and $AFR_{stRD}$ from module 304. Gamma ratio module 340 determines and outputs a gamma ratio signal as a ratio of the final_fuel control term to $FF_{stRD}$. $FF_{stRD}$ can be an input to gamma ratio module from module 310, or, as illustrated in FIG. 4, $FF_{stRD}$ can be determined based upon MAF sensor signal from module 302 and an $AFR_{stRD}$ value of 14.59 from module 304 in module 340. Gamma ratio module 340 outputs a continuous signal of the gamma ratio. However, control based upon the adaptation factor is only desirable when a regeneration event is active. Signal activation module 350 monitors a regeneration event signal from module 308 including a value of one when a regeneration event is active and a value of zero when a regeneration event is not active. Signal activation module 350 multiplies the gamma ratio by the regeneration event signal, outputting the gamma ratio when the regeneration event is active and a null signal when the regeneration event is not active. Kalman filter module 360 monitors the signal from module 350 and determines and outputs a filtered adaptation gain according to the methods disclosed herein. Adaptation filter 390 monitors the filtered adaptation gain and applies a first order or linear filter according to Eq. 19 to determine and output an output adaptation rate to be used as an adaptation factor in module 320, adapting a next value of the feed forward fuel control term based upon properties of the fuel being utilized by the engine. Configuration 300 is an exemplary embodiment of an information flow to control the engine during a regeneration event using an adaptation factor, but the disclosure is not intended to be limited to the exemplary embodiments provided herein.

Figure 6:
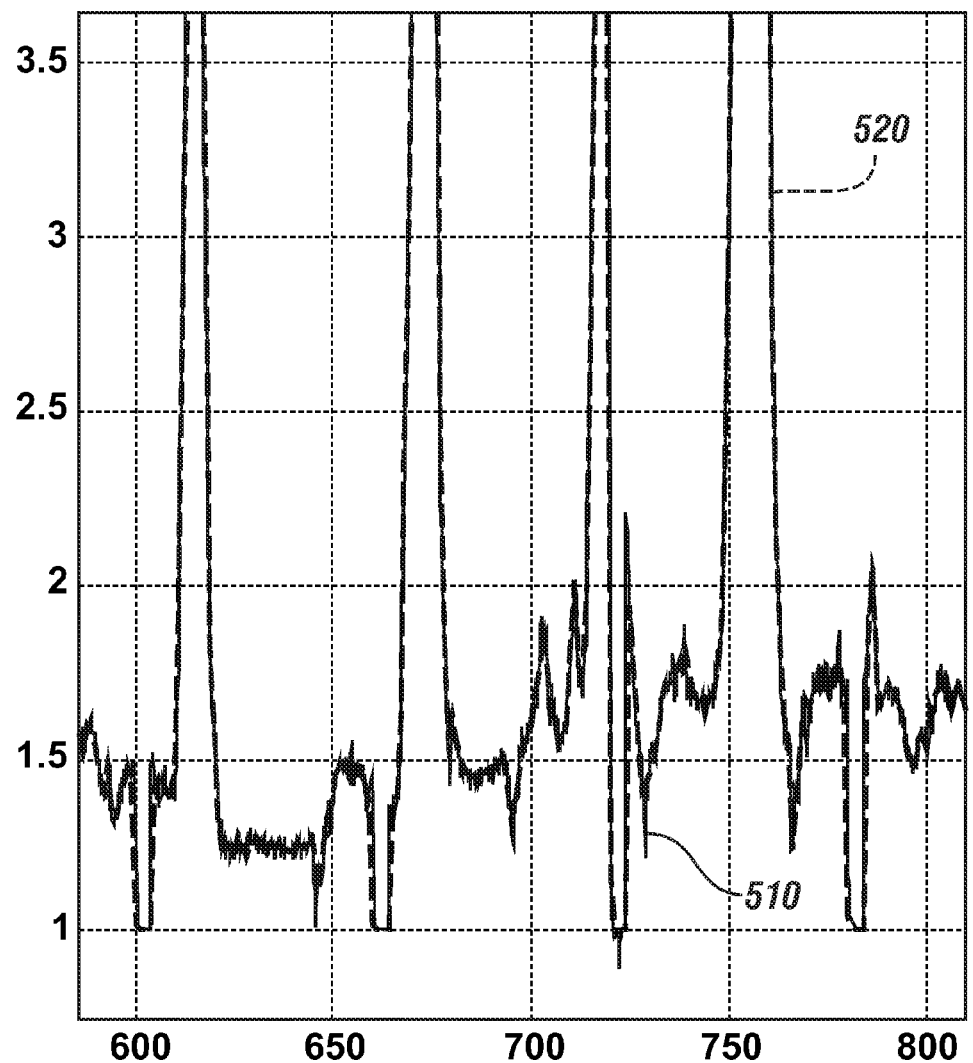
FIG. 6 illustrates exemplary modeled results achieved by control with and without adaptive feed forward control methods, in accordance with the present disclosure.

Adapting feed forward fuel control terms to the engine during regeneration events can reduce the negative effects of using fuel including a mixture of diesel fuel and biodiesel fuel. FIG. 6 illustrates exemplary modeled results achieved by control with and without the adaptive feed forward control methods disclosed herein. A horizontal x-axis illustrates time in seconds. The vertical y-axis illustrates lambda. Plot 510, shown as a solid line, illustrates results of an engine operated without adaptive feed forward control. At approximately 700 seconds, the fuel utilized by the engine changes from B0 to some mixture of diesel and biodiesel. Results of the operation after 700 seconds during periods of regeneration wherein the lambda is controlled to or close to 1.0 includes overshoot and slow response typical to a system operating with increased feedback control. Plot 520, shown as a dotted line, illustrates results of an engine operated with adaptive feed forward control as disclosed herein responding to the same operating inputs as plot 510. Control of the operation after 700 seconds includes more stable operation, such that control of lambda before and control of lambda after 700 seconds are substantially similar.

Figure 5:
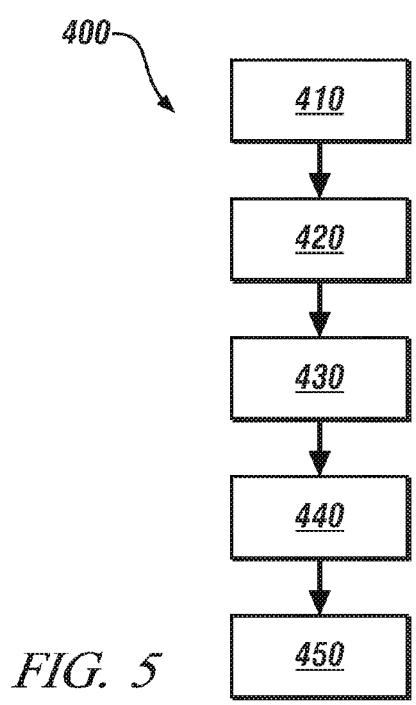
FIG. 5 illustrates an exemplary process to control a regeneration event based upon an adaptation factor, in accordance with the present disclosure.

FIG. 5 illustrates an exemplary process to control a regeneration event based upon an adaptation factor. Table 1 is provided as a key wherein the numerically labeled blocks and the corresponding functions are set forth as follows.

TABLE 1

| BLOCK | BLOCK CONTENTS |
|---|---|
| 410 | Start |
| 420 | Monitor $FF_{stRD}$ |
| 430 | Determine an Indication of a Biodiesel Blend Ratio for Fuel Being Utilized by the Engine |
| 440 | Determine α Based upon the Indication of the Biodiesel Blend Ratio |
| 450 | Control the Engine Based Upon $FF_{stRD}$ and α |

Process 400 begins at block 410, for example, wherein a regeneration event is commanded. At block 420, $FF_{stRD}$ is monitored, for example, as a value generated by a feed forward command module based upon desired operation of the engine. At block 430, an indication of a biodiesel blend ratio for fuel being utilized by the engine is monitored or determined. Examples of methods to monitor or determine this indication include directly estimating a biodiesel blend ratio, determining the indication based upon a magnitude of feedback control, determining $AFR_{stBD}$, or determining $LHV_{BD}$. At block 440, a value for α is determined based upon the indication of the biodiesel blend ratio. At block 450, the engine is controlled through the regeneration event based upon α. Process 400 is an exemplary process to control an engine based upon an indication of a biodiesel blend ratio, but the disclosure is not intended to be limited to the particular examples provided herein.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method to control an internal combustion engine fueled by a fuel blend of a diesel fuel and a biodiesel fuel and equipped with a lean NOx trap for treating an exhaust gas flow from the engine, the method comprising:
providing a feed forward fuel control term corresponding to a fuel blend of 100 percent diesel fuel and 0 percent biodiesel fuel;
providing a feedback fuel control term as a function of a deviation in the engine air fuel ratio from an air fuel ratio target;
during engine operation wherein said lean NOx trap is not being regenerated, providing a final fuel control term as function of the feed forward fuel control term and the feedback fuel control term;
during engine operation wherein said lean NOx trap is being regenerated, providing a feed forward adaptation factor as a function of the feed forward fuel control term and the final fuel control term, applying the feed forward adaptation factor to the feed forward fuel control term to provide an adapted feed forward fuel control term, and providing the final fuel control term as a function of the adapted feed forward fuel control term and the feedback fuel control term; and
fueling the engine in accordance with the final fuel control term.

2. Method to control a regeneration event of a lean NOx trap treating an exhaust gas flow from an internal combustion engine fueled by a fuel blend of a diesel fuel and a biodiesel fuel, the method comprising:
operating the engine with a fuel blend of a diesel fuel and a biodiesel fuel;
providing a feed forward fuel control term corresponding to a fuel blend of 100 percent diesel fuel and 0 percent biodiesel fuel;
monitoring an indication of the fuel blend;
determining a feed forward control adaptation factor based upon the indication of the fuel blend; and
controlling the engine during the regeneration event based upon the feed forward fuel control term and the feed forward control adaptation factor.

3. The method of claim 2, wherein determining the feed forward control adaptation factor comprises referencing the feed forward control adaptation factor from a predetermined look-up table correlating values of the feed forward control adaptation factor and fuel blend.

4. The method of claim 2, wherein monitoring the indication of the fuel blend comprises:
monitoring a final fuel command for a combustion cycle;
determining a magnitude of a feedback control signal based upon the final fuel command and the feed forward fuel control term; and
determining the fuel blend based upon the magnitude of the feedback control signal.

5. The method of claim 2, wherein monitoring the indication of the fuel blend comprises:
monitoring a final fuel command for a combustion cycle; and
wherein determining the feed forward control adaptation factor comprises utilizing a state space model and a Kalman filter to determine the feed forward control adaptation factor based upon the final fuel command.

6. The method of claim 5, further comprising determining a ratio of the final fuel command to the feed forward fuel control term; and
wherein utilizing a state space model and a Kalman filter to determine the feed forward control adaptation factor based upon the final fuel command comprises determining the feed forward control adaptation factor based upon the ratio of the final fuel command to the feed forward fuel control term.

7. The method of claim 2, wherein monitoring the indication of the fuel blend comprises:
monitoring an air fuel ratio at stoichiometry for the fuel blend; and
wherein determining the feed forward control adaptation factor comprises comparing the air fuel ratio at stoichiometry for the fuel blend to an air fuel ratio at stoichiometry for a fuel blend of 100 percent diesel fuel and 0% biodiesel fuel.

8. The method of claim 2, wherein monitoring the indication of the fuel blend comprises:
monitoring a lower heating value for the fuel blend; and
wherein determining the feed forward control adaptation factor comprises comparing the lower heating value for the fuel blend to a lower heating value for a fuel blend of 100 percent diesel fuel and 0% biodiesel fuel.

9. The method of claim 2, further comprising:
providing an air fuel ratio at stoichiometry for a fuel blend of 100 percent diesel fuel and 0% biodiesel fuel;
monitoring an air fuel ratio at stoichiometry for the fuel blend;
providing an air throttle command corresponding to a fuel blend of 100 percent diesel fuel and 0% biodiesel fuel; and
determining an air throttle command adjusted to the fuel blend.

10. The method of claim 2, wherein determining the feed forward control adaptation factor comprises applying an adaptation rule comprising a first order filter.

11. System for determining fuel control terms for an internal combustion engine fueled by a fuel blend of a diesel fuel and a biodiesel fuel and equipped with a lean NOx trap for treating an exhaust gas flow from the engine, the system comprising:
- a first control module providing a feed forward fuel control term corresponding to a fuel blend of 100 percent diesel fuel and 0 percent biodiesel fuel;
- a second control module providing a feedback fuel control term as a function of a deviation in the engine air fuel ratio from an air fuel ratio target; and
- a third control module
    - when said lean NOx trap is not being regenerated, providing a final fuel control term as function of the feed forward fuel control term and the feedback fuel control term during engine operation, and
    - when said lean NOx trap is being regenerated, providing a feed forward adaptation factor as a function of the feed forward fuel control term and the final fuel control term, applying the feed forward adaptation factor to the feed forward fuel control term to provide an adapted feed forward fuel control term, and providing the final fuel control term as a function of the adapted feed forward fuel control term and the feedback fuel control term during engine operation.

* * * * *